(12) United States Patent
Jin et al.

(10) Patent No.: US 8,810,940 B2
(45) Date of Patent: Aug. 19, 2014

(54) SYSTEMS AND METHODS FOR OFF TRACK ERROR RECOVERY

(75) Inventors: Ming Jin, Fremont, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 458 days.

(21) Appl. No.: 13/021,814

(22) Filed: Feb. 7, 2011

(65) Prior Publication Data

US 2012/0200954 A1 Aug. 9, 2012

(51) Int. Cl.
*G11B 5/09* (2006.01)

(52) U.S. Cl.
USPC .......... 360/39; 360/25; 360/53; 360/75; 360/77.01; 360/77.06

(58) Field of Classification Search
None
See application file for complete search history.

(56) References Cited

U.S. PATENT DOCUMENTS

| | | |
|---|---|---|
| 5,278,703 A | 1/1994 | Rub |
| 5,278,846 A | 1/1994 | Okayama et al. |
| 5,325,402 A | 6/1994 | Ushirokawa |
| 5,392,299 A | 2/1995 | Rhines et al. |
| 5,471,500 A | 11/1995 | Blaker et al. |
| 5,513,192 A | 4/1996 | Janku et al. |
| 5,523,903 A | 6/1996 | Hetzler |
| 5,550,870 A | 8/1996 | Blaker et al. |
| 5,612,964 A | 3/1997 | Haraszti |
| 5,701,314 A | 12/1997 | Armstrong et al. |
| 5,710,784 A | 1/1998 | Kindred et al. |
| 5,712,861 A | 1/1998 | Inoue et al. |
| 5,717,706 A | 2/1998 | Ikeda |
| 5,768,044 A | 6/1998 | Hetzler |
| 5,802,118 A | 9/1998 | Bliss et al. |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |

(Continued)

FOREIGN PATENT DOCUMENTS

| | | |
|---|---|---|
| EP | 0522578 | 1/1993 |
| EP | 0631277 | 12/1994 |

(Continued)

OTHER PUBLICATIONS

U.S. Appl. No. 11/461,026, filed Jul. 31, 2006, Tan, Weijun.
U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.

(Continued)

*Primary Examiner* — Dismery Mercedes
(74) *Attorney, Agent, or Firm* — Hamilton DeSanctis & Cha (57) ABSTRACT

Various embodiments of the present invention provide systems and methods for recovering data from a storage medium. As an example, a data recovery circuit is disclosed that includes: a controller circuit, a data processing circuit, a selector circuit, and a combining circuit. The controller circuit is operable to position a sensor over a track of the storage medium at a first distance from the center of the track to yield a first data set, and to position the sensor over the track of the storage medium at a second distance from the center of the track to yield a second data set. The data processing circuit is operable to process a processing data set, and the selector circuit is operable to select between the first data set and a combined data set as the processing data set. The combining circuit is operable to combine the first data set with at least the second data set to yield the combined data set.

21 Claims, 4 Drawing Sheets

(56) References Cited

U.S. PATENT DOCUMENTS

| | | |
|---|---|---|
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,065,149 A | 5/2000 | Yamanaka |
| 6,097,764 A | 8/2000 | McCallister et al. |
| 6,145,110 A | 11/2000 | Khayrallah |
| 6,157,510 A * | 12/2000 | Schreck et al. ............ 360/77.06 |
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,525,897 B2 * | 2/2003 | Despain et al. ............ 360/77.06 |
| 6,625,775 B1 | 9/2003 | Kim |
| 6,657,803 B1 | 12/2003 | Ling et al. |
| 6,671,404 B1 | 12/2003 | Kawatani et al. |
| 6,748,034 B2 | 6/2004 | Hattori et al. |
| 6,757,862 B1 | 6/2004 | Marianetti |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman |
| 7,010,051 B2 | 3/2006 | Murayama et al. |
| 7,047,474 B2 | 5/2006 | Rhee et al. |
| 7,058,873 B2 | 6/2006 | Song et al. |
| 7,073,118 B2 | 7/2006 | Greeberg et al. |
| 7,088,535 B2 * | 8/2006 | Kim et al. ....................... 360/53 |
| 7,093,179 B2 | 8/2006 | Shea |
| 7,113,356 B1 | 9/2006 | Wu |
| 7,136,244 B1 | 11/2006 | Rothbert |
| 7,154,690 B1 * | 12/2006 | Brunnett et al. ................ 360/60 |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 | 4/2007 | Eroz et al. |
| 7,236,757 B2 | 6/2007 | Raghavan et al. |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghavan et al. |
| 7,430,256 B2 | 9/2008 | Zhidkov |
| 7,502,189 B2 | 3/2009 | Sawaguchi et al. |
| 7,505,537 B1 | 3/2009 | Sutardja |
| 7,523,375 B2 | 4/2009 | Spencer |
| 7,587,657 B2 | 9/2009 | Haratsch |
| 7,589,372 B2 | 9/2009 | Shin |
| 7,590,168 B2 | 9/2009 | Raghavan et al. |
| 7,702,989 B2 | 4/2010 | Graef et al. |
| 7,712,008 B2 | 5/2010 | Song et al. |
| 7,738,201 B2 | 6/2010 | Jin et al. |
| 7,752,523 B1 | 7/2010 | Chaichanavong |
| 7,760,455 B2 * | 7/2010 | Kang et al. ....................... 360/48 |
| 7,801,200 B2 | 9/2010 | Tan |
| 7,802,163 B2 | 9/2010 | Tan |
| 8,059,353 B1 * | 11/2011 | Chen ............................. 360/53 |
| 2003/0063405 A1 | 4/2003 | Jin et al. |
| 2003/0081693 A1 | 5/2003 | Raghavan et al. |
| 2003/0087634 A1 | 5/2003 | Raghavan et al. |
| 2003/0112896 A1 | 6/2003 | Raghavan et al. |
| 2003/0134607 A1 | 7/2003 | Raghavan et al. |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0078399 A1 | 4/2005 | Fung |
| 2005/0111540 A1 | 5/2005 | Modrie et al. |
| 2005/0157780 A1 | 7/2005 | Werner et al. |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song et al. |
| 2006/0195772 A1 | 8/2006 | Graef et al. |
| 2006/0210002 A1 | 9/2006 | Yang et al. |
| 2006/0248435 A1 | 11/2006 | Haratsch |
| 2006/0256670 A1 | 11/2006 | Park et al. |
| 2007/0011569 A1 | 1/2007 | Casado et al. |
| 2007/0047121 A1 | 3/2007 | Eleftheriou et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0258165 A1 * | 11/2007 | Ahn et al. ....................... 360/76 |
| 2007/0279788 A1 * | 12/2007 | Andersen et al. ............... 360/53 |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0168330 A1 | 7/2008 | Graef et al. |
| 2008/0276156 A1 | 11/2008 | Gunnam |
| 2008/0301521 A1 | 12/2008 | Gunnam |
| 2009/0046385 A1 * | 2/2009 | Yamamoto ....................... 360/2 |
| 2009/0185643 A1 | 7/2009 | Fitzpatrick |
| 2009/0199071 A1 | 8/2009 | Graef |
| 2009/0235116 A1 | 9/2009 | Tan et al. |
| 2009/0235146 A1 | 9/2009 | Tan |
| 2009/0259915 A1 | 10/2009 | Livshitz et al. |
| 2009/0273492 A1 | 11/2009 | Yang et al. |
| 2009/0274247 A1 | 11/2009 | Galbraith et al. |
| 2009/0310249 A1 * | 12/2009 | Michinaga ................. 360/77.02 |
| 2010/0002795 A1 | 1/2010 | Raghavan et al. |
| 2010/0042877 A1 | 2/2010 | Tan |
| 2010/0042890 A1 | 2/2010 | Gunnam |
| 2010/0050043 A1 | 2/2010 | Savin |
| 2010/0061492 A1 | 3/2010 | Noeldner |
| 2010/0070837 A1 | 3/2010 | Xu et al. |
| 2010/0164764 A1 | 7/2010 | Nayak |
| 2010/0185914 A1 | 7/2010 | Tan et al. |
| 2011/0075569 A1 | 3/2011 | Marrow et al. |
| 2011/0080211 A1 | 4/2011 | Yang et al. |
| 2011/0167246 A1 | 7/2011 | Yang et al. |

FOREIGN PATENT DOCUMENTS

| | | |
|---|---|---|
| EP | 1814108 | 8/2007 |
| WO | WO 2006/016751 | 2/2006 |
| WO | WO 2006/134527 | 12/2006 |
| WO | WO 2007/091797 | 8/2007 |
| WO | WO 2010/126482 | 4/2010 |
| WO | WO 2010/101578 | 9/2010 |

OTHER PUBLICATIONS

U.S. Appl. No. 12/792,555, filed Jun. 2, 2010, Liu, et al.
U.S. Appl. No. 12/887,317, filed Sep. 21, 2010, Xia, et al.
U.S. Appl. No. 12/887,330, filed Sep. 21, 2010, Zhang, et al.
U.S. Appl. No. 12/887,369, filed Sep. 21, 2010, Liu, et al.
U.S. Appl. No. 12/901,816, filed Oct. 11, 2010, Li, et al.
U.S. Appl. No. 12/901,742, filed Oct. 11, 2010, Yang.
U.S. Appl. No. 12/917,756, filed Nov. 2, 2010, Miladinovic, et al.
U.S. Appl. No. 12/947,931, filed Nov. 17, 2010, Yang, Shaohua.
U.S. Appl. No. 12/947,947, filed Nov. 17, 2010, Ivkovic, et al.
U.S. Appl. No. 12/972,942, filed Dec. 20, 2010, Liao, et al.
U.S. Appl. No. 12/992,948, filed Nov. 16, 2010, Yang, et al.
U.S. Appl. No. 13/021,814, filed Feb. 7, 2011, Jin, Ming, et al.
U.S. Appl. No. 13/031,818, filed Feb. 22, 2011, Xu, Changyou, et al.
U.S. Appl. No. 13/050,129, filed Mar. 17, 2011, Tan, et al.
U.S. Appl. No. 13/050,765, filed Mar. 17, 2011, Yang, et al.
U.S. Appl. No. 13/088,119, filed Apr. 15, 2011, Zhang, et al.

(56) References Cited

OTHER PUBLICATIONS

U.S. Appl. No. 13/088,146, filed Apr. 15, 2011, Li, et al.
U.S. Appl. No. 13/088,178, filed Apr. 15, 2011, Sun, et al.
U.S. Appl. No. 13/126,748, filed Apr. 28, 2011, Tan.
U.S. Appl. No. 13/167,764, filed Jun. 24, 2011, Li, Zongwang, et al.
U.S. Appl. No. 13/167,771, filed Jun. 24, 2011, Li, Zogwang, et al.
U.S. Appl. No. 13/167,775, filed Jun. 24, 2011, Li, Zongwang.
U.S. Appl. No. 13/186,146, filed Jul. 19, 2011, Mathew, et al.
U.S. Appl. No. 13/186,213, filed Jul. 19, 2011, Mathew, et al.
U.S. Appl. No. 13/186,234, filed Jul. 19, 2011, Xia, Haitao, et al.
U.S. Appl. No. 13/186,251, filed Jul. 19, 2011, Xia, Haitao, et al.
U.S. Appl. No. 13/186,174, filed Jul. 19, 2011, Mathew, et al.
U.S. Appl. No. 13/186,197, filed Jul. 19, 2011, Mathew, George et al.
U.S. Appl. No. 13/213,751, filed Aug. 19, 2011, Zhang, Fan, et al.
U.S. Appl. No. 13/213,808, filed Aug. 19, 2011, Jin, Ming.
U.S. Appl. No. 13/220,142, filed Aug. 29, 2011, Chang, Wu, et al.
U.S. Appl. No. 13/227,538, filed Sep. 8, 2011, Yang, Shaohua, et al.
U.S. Appl. No. 13/227,544, filed Sep. 8, 2011, Yang, Shaohua, et al.
U.S. Appl. No. 13/239,683, filed Sep. 22, 2011, Xu, Changyou.
U.S. Appl. No. 13/239,719, filed Sep. 22, 2011, Xia, Haitao, et al.
U.S. Appl. No. 13/251,342, filed Oct. 2, 2011, Xia, Haitao, et al.
U.S. Appl. No. 13/269,832, filed Oct. 10, 2011, Xia, Haitao, et al.
U.S. Appl. No. 13/269,852, filed Oct. 10, 2011, Xia, Haitao, et al.
U.S. Appl. No. 13/284,819, filed Oct. 28, 2011, Tan, Weijun, et al.
U.S. Appl. No. 13/284,730, filed Oct. 28, 2011, Zhang, Fan, et al.
U.S. Appl. No. 13/284,754, filed Oct. 28, 2011, Zhang, Fan, et al.
U.S. Appl. No. 13/284,767, filed Oct. 28, 2011, Zhang, Fan, et al.
U.S. Appl. No. 13/284,826, filed Oct. 28, 2011, Tan, Weijun, et al.
U.S. Appl. No. 13/295,150, filed Nov. 14, 2011, Li, Zongwang, et al.
U.S. Appl. No. 13/295,160, filed Nov. 14, 2011, Li, Zongwang, et al.
U.S. Appl. No. 13/251,340, filed Oct. 3, 2011, Xia, Haitao, et al.
Amer et al "Design Issues for a Shingled Write Disk System" MSST IEEE 26th Symposium May 2010.
Bahl, et al "Optimal decoding of linear codes for Minimizing symbol error rate", IEEE Trans. Inform. Theory, vol. 20, pp. 284-287, Mar. 1974.
Casado et al., Multiple-rate low- denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gibson et al "Directions for Shingled-Write and Two-Dimensional Magnetic Recording System" Architectures: Synergies with Solid-State Disks Carnegie Mellon Univ. May 1, 2009.
K. Gunnam et al., "Next Generation iterative LDPC solutions for magnetic recording storage", invited paper. The Asilomar Conference on Signals, Systems, and Computers, Nov. 2008.
K. Gunnam et al., "Value-Reuse Properties of Min-Sum for GF(q)" (dated Oct. 2006) Dept. of ECE, Texas A&M University Technical Note, published about Aug. 2010.
K. Gunnam et al., "Value-Reuse Properties of Min-Sum for GF(q)"(dated Jul. 2008) Dept. of ECE, Texas A&M University Technical Note, published about Aug. 2010.
K. Gunnam "Area and Energy Efficient VLSI Architectures for Low-Density Parity-Check Decoders Using an On-The-Fly Computation" dissertation at Texas A&M University, Dec. 2006.
Han and Ryan, "Pinning Techniques for Low-Floor Detection/Decoding of LDPC-Coded Partial Response Channels", 5th International Symposium on Turbo Codes &Related Topics, 2008.
Hagenauer, J. et al A Viterbi Algorithm with Soft-Decision Outputs and its Applications in Proc. IEEE Globecom, pp. 47. 11-47 Dallas, TX Nov. 1989.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Lin et al "An efficient VLSI Architecture for non binary LDPC decoders"—IEEE Transaction on Circuits and Systems II vol. 57, Issue 1 (Jan. 2010) pp. 51-55.
Mohsenin et al., "Split Row: A Reduced Complexity, High Throughput LDPC Decoder Architecture", pp. 1-6, printed from www.ece.ucdavis.edu on Jul. 9, 2007.
Moon et al, "Pattern-dependent noise prediction in signal-dependent Noise," IEEE JSAC, vol. 19, No. 4 pp. 730-743, Apr. 2001.
Perisa et al "Frequency Offset Estimation Based on Phase Offsets Between Sample Correlations" Dept. of Info. Tech. University of Ulm 2005.
Sari H et al., "Transmission Techniques for Digital Terrestrial TV Broadcasting" IEEE Communications Magazine, IEEE Service Center NY, NY vol. 33, No. 2 Feb. 1995.
Selvarathinam, A.: "Low Density Parity-Check Decoder Architecture for High Throughput Optical Fiber Channels" IEEE International Conference on Computer Design (ICCD '03) 2003.
Shu Lin, Ryan, "Channel Codes, Classical and Modern" 2009, Cambridge University Press, pp. 213-222.
Unknown, "Auto threshold and Auto Local Threshold" [online] [retrieved May 28, 2010] Retrieved from the Internet: <URL:http://www.dentristy.bham.ac.uk/landinig/software/autoth.
Vasic, B., "High-Rate Low-Density Parity-Check Codes Based on Anti-Pasch Affine Geometries," Proc ICC 2002, pp. 1332-1336.
Vasic, B., "High-Rate Girth-Eight Codes on Rectangular Integer Lattices", IEEE Trans. Communications, vol. 52, Aug. 2004, pp. 1248-1252.
Wang Y et al., "A Soft Decision Decoding Scheme for Wireless COFDM With Application to DVB-T" IEEE Trans. on Consumer elec., IEEE Service Center, NY,NY vo. 50, No. 1 Feb. 2004.
Weon-Cheol Lee et al., "Viterbi Decoding Method Using Channel State Info. in COFDM System" IEEE Trans. on Consumer Elect., IEEE Service Center, NY, NY vol. 45, No. 3 Aug. 1999.
Xia et al, "A Chase-GMD algorithm of Reed-Solomon codes on perpendicular channels", IEEE Transactions on Magnetics, vol. 42 page(s): 2603-2605, Oct. 2006.
Xia et al, "Reliability-based Reed-Solomon decoding for magnetic recording channels", IEEE International Conference on Communication pp. 1977-1981, May 2008.
Yeo et al., "VLSI Architecture for Iterative Decoders in Magnetic Storage Channels", Mar. 2001, pp. 748-755, IEEE trans. Magnetics, vol. 37, No. 2.
Youn, et al. "BER Perform. Due to Irrreg. of Row-Weight Distrib. of the Parity-Chk. Matirx in Irreg. LDPC Codes for 10-Gb/s Opt. Signls" Jrnl of Lightwave Tech., vol. 23, Sep. 2005.
Zhong et al., "Area-Efficient Min-Sum Decoder VLSI Architecture for High-Rate QC-LDPC Codes in Magnetic Recording", pp. 1-15, Submitted 2006, not yet published.
Zhong, "Block-LDPC: A Practical LDPC Coding System Design Approach", IEEE Trans. on Circuits, Regular Papers, vol. 5, No. 4, pp. 766-775, Apr. 2005.
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Iterative MAX-LOG-MAP and LDPC Detector/Decoder Hardware Implementation for Magnetic Read Channel", SRC TECHRON, pp. 1-4, Oct. 2005.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.
Zhong, "VLSI Architecture of LDPC Based Signal Detection and Coding System for Magnetic Recording Channel", Thesis, RPI, Troy, NY, pp. 1-95, May 2006.

\* cited by examiner

SYSTEMS AND METHODS FOR OFF TRACK ERROR RECOVERY

BACKGROUND OF THE INVENTION

The present inventions are related to systems and methods for data retrieval, and more particularly to systems and methods for retrieving data from a track based storage medium.

Various circuits have been developed that provide for accessing data from a storage medium. As an example, a disk drive system typically includes a head that is positioned in relation to data on a storage medium to allow for sensing the information maintained on the storage medium. Where the head is not positioned correctly, the information on the storage medium may not be readable, and an error message is generated. Such a failure to properly recover data from the storage medium is undesirable.

Hence, for at least the aforementioned reasons, there exists a need in the art for advanced systems and methods for recovering data from a storage medium.

BRIEF SUMMARY OF THE INVENTION

The present inventions are related to systems and methods for data retrieval, and more particularly to systems and methods for retrieving data from a track based storage medium.

Various embodiments of the present invention provide data recovery circuits that include: a controller circuit, a data processing circuit, a selector circuit, and a combining circuit. The controller circuit is operable to position a sensor over a track of the storage medium at a first distance from the center of the track to yield a first data set, and to position the sensor over the track of the storage medium at a second distance from the center of the track to yield a second data set. The data processing circuit is operable to process a processing data set, and the selector circuit is operable to select between the first data set and a combined data set as the processing data set. The combining circuit operable to combine the first data set with at least the second data set to yield the combined data set.

In some instances of the aforementioned embodiments, the combining circuit is an averaging circuit operable to average the first data set with at least the second data set to yield the combined data set. In some cases, the averaging circuit includes: a coefficient table, an accumulation memory, a first multiplier circuit, a second multiplier circuit, and a summation circuit. The coefficient table is operable to provide a first coefficient and a second coefficient each corresponding to a number of data sets included in the combined data set. The accumulation memory is operable to store the combined data set. The first multiplier circuit is operable to multiply the first data set by the first coefficient to yield a first weighted data set, and the second multiplier circuit is operable to multiply a prior instance of the combined data set by the second coefficient to yield a second weighted data set. The summation circuit is operable to sum the first weighted data set with the second weighted data set to yield the combined data set. In one or more particular cases, the first coefficient is one and the second coefficient is zero when the first data set is an initial data set, and when the first data set is greater than the seventh consecutive data set the first coefficient and the second coefficient are the same as for a previously combined data set.

In various instances of the aforementioned embodiments, the circuit further includes an analog to digital converter circuit operable to receive a signal derived from the head and to provide a corresponding series of digital samples; and an equalizer circuit operable to equalize the series of digital samples to yield the first data set and the second data set. In some instances of the aforementioned embodiments, the data processing circuit includes a data detection circuit and a data decoding circuit. In one or more instances of the aforementioned embodiments, the circuit further includes a head location controller circuit operable to position the sensor relative to the storage medium. In some such instances, the first distance from the center of the track is controlled by the head location controller based upon an input from the controller circuit, and the first distance from the center of the track is between a maximum positive offset and a negative maximum offset. In some cases, the input from the controller circuit is generated at least in part on a programmable offset value and a programmable step value.

Other embodiments of the present invention provide methods for data recovery. The methods include: providing a storage medium having data stored along a track; receiving a first data set corresponding to information sensed from the track using a sensor disposed over the track at a first offset distance from the center of the track; receiving a second data set corresponding to information sensed from the track using the sensor disposed over the track at a second offset distance from the center of the track; combining the first data set with at least the second data set to yield a combined data set; and processing the combined data set.

In some cases, processing the combined data set includes performing a data detection and a data decoding on the data set. In various instances of the aforementioned embodiments, the method further includes: positioning the sensor over the track at the first offset distance from the center of the track; and positioning the sensor over the track at the second offset distance from the center of the track. In some instances of the aforementioned embodiments, the first offset distance from the center of the track is a maximum offset, and the maximum offset is programmable. In various instances of the aforementioned embodiments, the method further includes calculating the second offset from the center of the track. In such instances, calculating the second offset from the center of the track is done by adding a step value to a previous offset position to yield the second offset from the center of the track. In some instances, combining the first data set with at least the second data set to yield the combined data set includes averaging the first data set with at least the second data set such that the combined data set is an average data set.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data retrieval, and more particularly to systems and methods for retrieving data from a track based storage medium.

Figure 1:
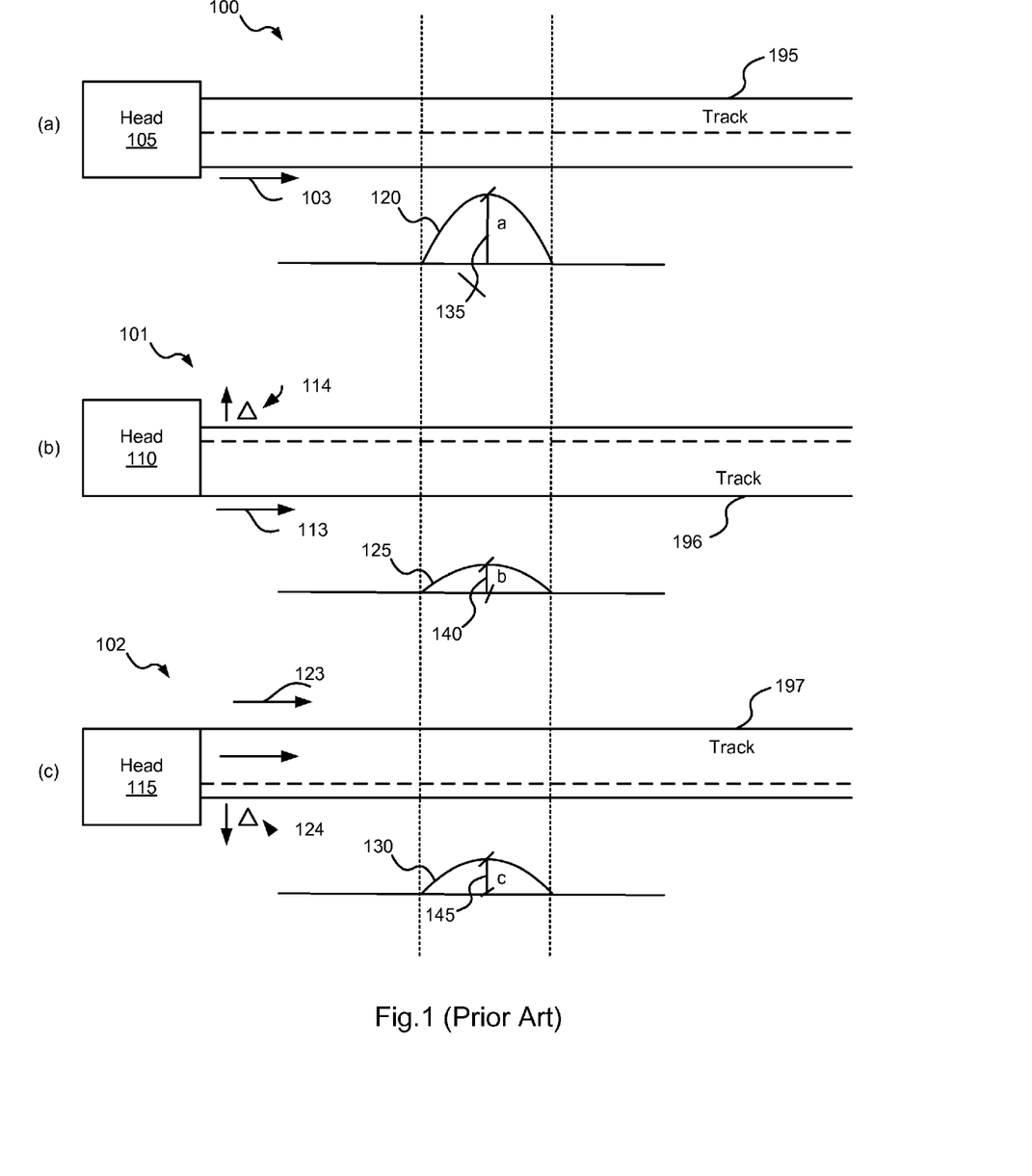
FIG. 1 depicts three track based read scenarios that occur in state of the art data recovery.

Turning to FIG. 1, three track read scenarios 100, 101, 102 are depicted that occur in state of the art data recovery. Scenario 100 shows a head 105 (i.e., a sensing device or sensor) flying over a track 195 in a direction 103. The dashed center line represents the alignment of head 105 relative to track 195. In scenario 100, head 105 is well centered over track 195. Such a centered disposition of head 105 relative to track 195 yields a sensed signal output 120 with an amplitude 135.

Scenario 101 shows a head 110 flying over a track 195 in a direction 113. The dashed center line represents the alignment of head 110 relative to a track 196. In scenario 101, head 110 is offset from track 196 by a positive delta distance 114. Such an offset orientation of head 110 relative to track 196 yields a sensed signal output 125 with an amplitude 140. Of note, amplitude 140 is less than amplitude 135. Such a reduction in amplitude can result in an inability to recover the data sensed from track 196.

Scenario 102 shows a head 115 flying over a track 197 in a direction 123. The dashed center line represents the alignment of head 115 relative to a track 197. In scenario 102, head 115 is offset from track 197 by a negative delta distance 124. Such an offset orientation of head 115 relative to track 197 yields a sensed signal output 130 with an amplitude 145. Of note, amplitude 145 is less than amplitude 135. Such a reduction in amplitude can result in an inability to recover the data sensed from track 197.

Figure 2:
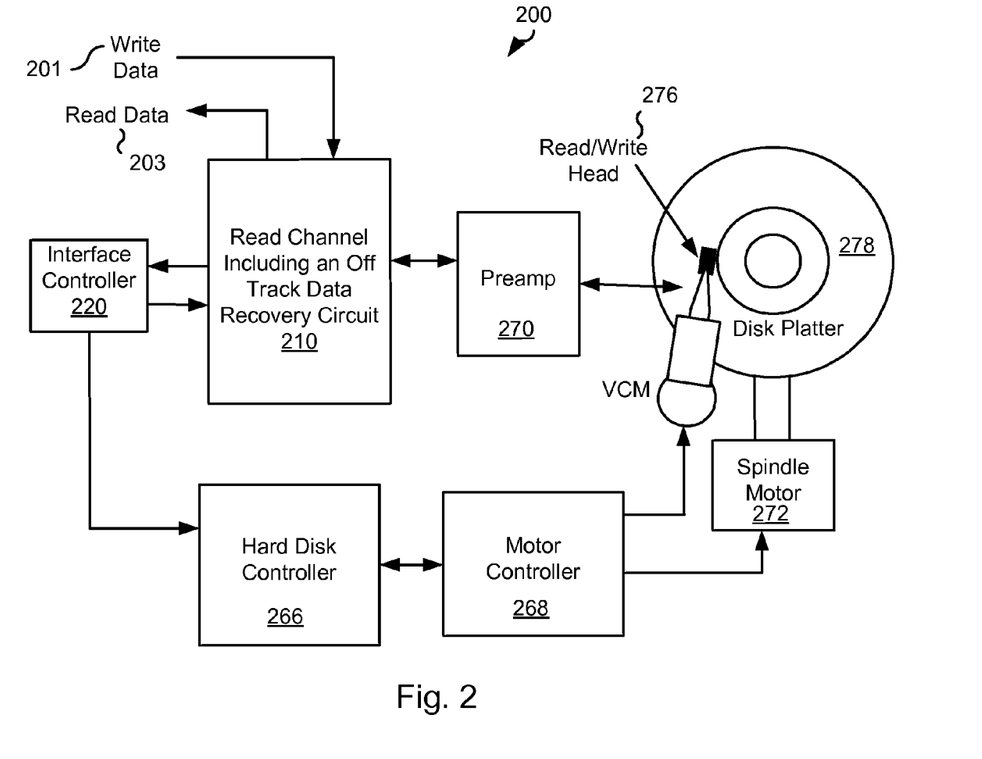
FIG. 2 shows a storage system including a read channel with an off track data recovery circuit in accordance with some embodiments of the present invention.

Turning to FIG. 2, a storage system 200 including a read channel circuit 210 with an off track data recovery circuit is shown in accordance with various embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 278 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel circuit 210 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. A write operation is substantially the opposite of the preceding read operation with write data 201 being provided to read channel circuit 210. This data is then encoded and written to disk platter 278.

In some cases, read channel circuit 210 is unable to recover the originally written data. In such cases, it may be tested whether the inability to recover the data is due to an improper positioning of read/write head assembly 276 relative to the track on disk platter 278 from which data is being read. Such an improper positioning results in an unacceptable lateral distance between read/write head assembly 276 and the center of the track being read. In such cases, the off track data recovery circuit included in read channel circuit 210 attempts to recover the data. The off track data recovery circuit may be implemented similar to that discussed in relation to FIG. 3 below, and/or may operate consistent with the method discussed in relation to FIG. 4 below.

It should be noted that storage system 200 may be integrated into a larger storage system such as, for example, a RAID (redundant array of inexpensive disks or redundant array of independent disks) based storage system. It should also be noted that various functions or blocks of storage system 200 may be implemented in either software or firmware, while other functions or blocks are implemented in hardware.

Figure 3:
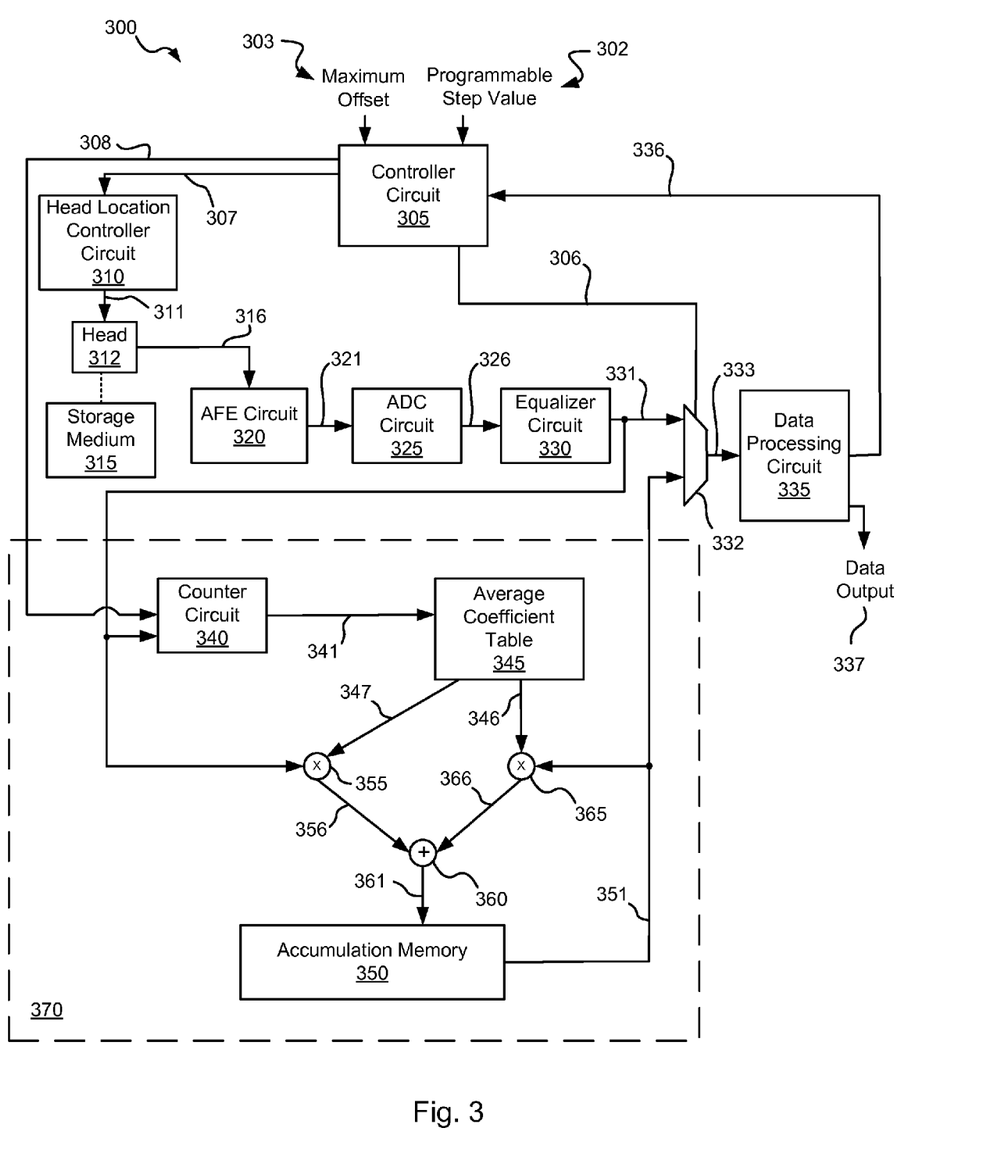
FIG. 3 depicts an off track data recovery circuit in accordance with some embodiments of the present invention.

Turning to FIG. 3, an off track data recovery circuit 300 is shown in accordance with some embodiments of the present invention. Off track data recovery circuit 300 includes a controller circuit 305 operable to provide control signals 307 to a head location controller circuit 310. In turn, head location controller circuit 310 provides a location control 311 to a head 312. In response to location control 311, head 312 is positioned relative to a track on a storage medium 315. Controller circuit 305 is operable to adjust the location of head 312 relative to a given track from a maximum offset (e.g., a maximum positive offset) from one direction from the center of the track as indicated by a maximum offset input 303 by discrete step amounts indicated by a programmable step value 302 to the maximum offset (e.g., a maximum negative offset) from the opposite direction from the center of the track. In some cases, both maximum offset input 303 and programmable step value 302 are programmable. In other cases, one or both of the aforementioned are fixed values.

At each step that controller circuit 305 moves head 312 relative to the center of the track being read, data is sensed from storage medium 315 and provided as an analog output 316 to an analog front end circuit 320. Analog front end circuit 320 includes various circuitry used to prepare analog output 316 for analog to digital conversion by analog to digital converter circuit 325. In some embodiments of the present invention, analog front end circuit 320 includes a preamplifier circuit (not shown) that amplifies analog output 316, and a continuous time filter (not shown) that filters the amplified output. In particular, analog front end circuit 320 provides a processed output 321 to analog to digital converter circuit 325 where it is converted to a series of digital samples 326.

Digital samples 326 are provided to an equalizer circuit 330 that performs an equalization to yield an equalized data set 331 to a multiplexer circuit 332. In some embodiments of the present invention equalizer circuit 330 is a digital finite impulse response filter as are known in the art. Multiplexer circuit 332 provides either equalized data set 331 or an averaged data set 351 as a processing data set 333. Controller circuit 305 provides a selector output 306 that controls which of the multiplexer inputs are provided as processing data set 333.

Processing data set 333 is provided to a data processing circuit 335 where it is processed in an attempt to recover the data originally written to storage medium 312. The recovered data is provided as data output 337, and a convergence indicator output 336 is provided to controller circuit 305. Data processing circuit 335 may be any circuit known in the art that is capable of decoding information in an attempt to recover an original data set. In one particular embodiment, data processing circuit includes a maximum a posteriori detector circuit and a low density parity check circuit as are known in the art. Other embodiments of the present invention include a data processing circuit that includes a Viterbi algorithm data detector circuit and a low density parity check circuit as are known in the art. Based upon the disclosure provided herein, one of ordinary skill in the art will recognize a variety of data processing circuits that may be used in relation to different embodiments of the present invention.

Off track data recovery circuit 300 includes a read averaging circuit 370 (shown in dashed lines) that is operable to average each of the data sets that are re-read each time controller circuit 305 causes an offset from the center of the track being read. Read averaging circuit 370 includes a counter circuit 340 that increments each time the track is successfully re-read under direction of a count output 308. In some embodiments, a data set is considered successfully re-read where the synchronization information included as part of the data set was properly identified. Counter circuit 340 is also reset once either the data from the particular track has been recovered as indicated by convergence indicator output 336 or once all of the steps between the positive maximum offset and the negative maximum offset from the center of the track have been processed. Counter circuit 340 provides a count output 341 to an average coefficient table 345. Count output 341 corresponds to the number of data sets that have been accumulated in an accumulation memory 350.

Based on count output 341, average coefficient table 345 provides a new data averaging coefficient 347 and an accumulated data averaging coefficient 346. These averaging coefficients are used to weight the newly received data relative to the already accumulated data to yield an average value. For example, where the count value is zero, new data averaging coefficient 347 is one and accumulated data averaging coefficient 346 is zero. In this case, equalized data set 331 (the newly received data set) is multiplied by one by a multiplier circuit 347 and provided as a weighted output 356 to a summation circuit 360. Averaged data set 351 from accumulation memory 350 is multiplied by zero by a multiplier circuit 365 and provided as a weighted output 366 to summation circuit 360. In turn, summation circuit 360 adds weighted output 356 to weighted output 366 to yield an average output 347 that is stored to accumulation memory 350. Of note, when count output 341 is zero (i.e., equalized data set 331 corresponds to the first re-read of the track), average output 361 is equalized data set 331.

As another example, when count output 341 is one new data averaging coefficient 347 is 0.5 and accumulated data averaging coefficient 346 is 0.5. In this case, equalized data set 331 is multiplied by 0.5 by multiplier circuit 347 and provided as weighted output 356 to summation circuit 360; and averaged data set 351 is multiplied by 0.5 by multiplier circuit 365 and provided as weighted output 366 to summation circuit 360. In turn, summation circuit 360 adds weighted output 356 to weighted output 366 to yield an average output 347 that is stored to accumulation memory 350. Of note, in this case (i.e., equalized data set 331 corresponds to the second re-read of the track), average output 361 is the average of equalized data set 331 and averaged data set 351.

As yet another example, when count output 341 is two new data averaging coefficient 347 is 0.33 and accumulated data averaging coefficient 346 is 0.67. In this case, equalized data set 331 is multiplied by 0.33 by multiplier circuit 347 and provided as weighted output 356 to summation circuit 360; and averaged data set 351 is multiplied by 0.67 by multiplier circuit 365 and provided as weighted output 366 to summation circuit 360. In turn, summation circuit 360 adds weighted output 356 to weighted output 366 to yield an average output 347 that is stored to accumulation memory 350. Of note, in this case (i.e., equalized data set 331 corresponds to the third re-read of the track), average output 361 is the weighted average of equalized data set 331 and averaged data set 351.

Controller circuit 305 asserts selector output 306 such that averaged data set 351 is provided as processing data set 333 by multiplexer circuit 332. As such, averaged data set 351 is processed by data processing circuit 335 to see if the averaged data set converges. Of note, when count output 341 is equal to zero, selector output 306 is asserted such that equalized data set 331 is provided as processing data set 333. When count output 341 is greater than zero, selector output 306 is asserted such that averaged data set 351 is provided as processing data set 333.

This process of averaging and performing data processing continues until either the data sets corresponding to each of the steps between the positive maximum offset and the negative maximum offset from the center of the track have been processed, or until a data convergence is indicated by convergence indicator output 336. The following pseudocode describes the operation of read averaging circuit 370:

```
For (i=0 to i=max)
{
    If (recently read data set is successfully received)
    {
        Average Output 361 = (1/1+i) Equalized
        Data Set 331 + (i/1+i) Averaged Data Set 351;
        i = i+1
    }
    If (average data set converges)
    {
        i = max
    }
}
```

In some cases to limit circuit complexity, any count output 341 that is greater than eight uses the same values for new data averaging coefficient 347 and accumulated data averaging coefficient 346. Thus, even where the number of steps between the negative maximum offset and the positive maximum offset is greater than eight, the maximum number of eight will be used in the averaging process. The following pseudocode describes the operation of read averaging circuit 370 where the coefficients based on the count value are limited:

```
For (i=0 to i=max)
{
    If (recently read data set is successfully received
    AND Count Output 341 < 8)
    {
```

-continued

```
        Average Output 361 = (1/1+i) Equalized
        Data Set 331 + (i/1+i) Averaged Data Set 351;
        i = i+1
    }
    Else If (recently read data set is successfully received
    AND Count Output 341 ≥ 8)
    {
        Average Output 361 = (1/8) Equalized
        Data Set 331 + (7/8) Averaged Data Set 351;
    }
    If (average data set converges)
    {
        i = max
    }
}
```

Figure 4:
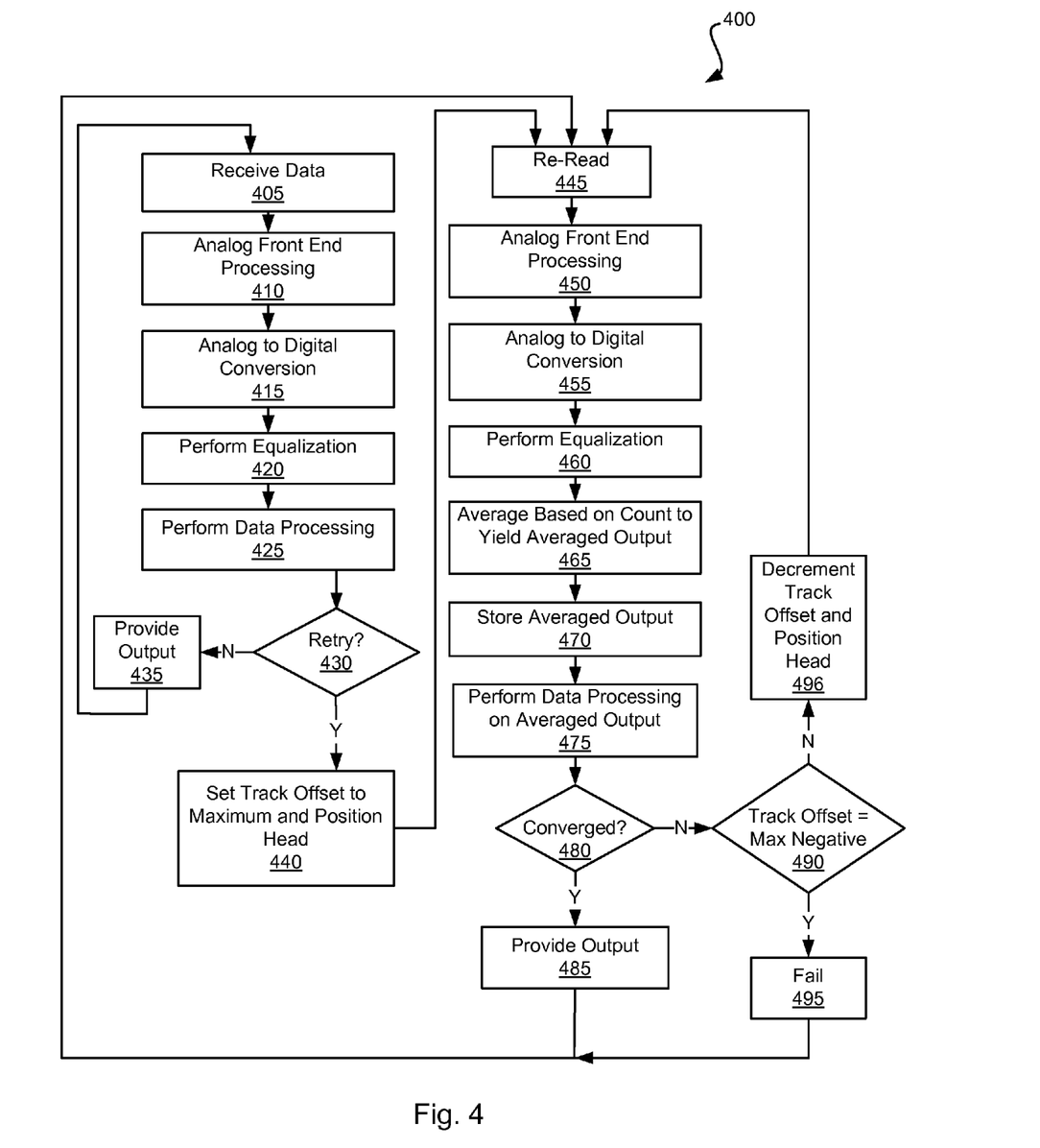
FIG. 4 is a flow diagram showing a process in accordance with some embodiments of the present invention for off track data recovery.

Turning to FIG. 4, a flow diagram 400 depicts a process in accordance with some embodiments of the present invention for off track data recovery. Following flow diagram 400, a data set is received (block 405). The data set is received by positioning a head over a storage medium in relation to a track. The data set is passed to an analog front end circuit where analog front end processing is performed (block 410). Such analog processing may be any processing known in the art for amplifying and/or filtering an analog signal. The processed data is provided to an analog to digital converter circuit where an analog to digital conversion is performed (block 415). Such an analog to digital conversion yields a series of digital samples corresponding to the input received from the analog front end processing. An equalization process is performed on the series of digital samples to yield an equalized data set (block 420). In some cases, the equalization process is performed by a digital finite impulse response filter circuit. Data processing is then performed on the equalized data set in an attempt to recover data originally written to the storage medium (block 425). Such data processing may be performed using any data processing approaches and/or circuitry known in the art. For example, the data processing circuit includes a maximum a posteriori detector circuit and a low density parity check circuit as are known in the art. Other embodiments of the present invention include a data processing circuit that includes a Viterbi algorithm data detector circuit and a low density parity check circuit as are known in the art. Based upon the disclosure provide herein, one of ordinary skill in the art will recognize a variety of circuitry and/or data processing methods that may be used in relation to different embodiments of the present invention.

It is determined whether a retry is desired (block 430). A retry is desired, for example, where the initial reading of the data set failed to converge. Such convergence occurs when the error correction codes and/or parity checking done by the data processing indicates an acceptable conclusion to the processing. Where a retry is not desired (e.g., the data set converged) (block 430), the recovered data set is provided as an output (block 435).

Alternatively, where a retry is desired (block 430), the head used to sense the data from the storage medium is moved to a positive maximum offset from the center of the track from which the data was originally read (block 440). With the head in this positive maximum offset orientation, the data set is re-read from the track (block 445). This re-read process includes moving or flying the head over the track with the defined offset from what is expected to be the center of the track associated with the data set being read. The received data set is passed to an analog front end circuit where analog front end processing is performed (block 450). Again, such analog processing may be any processing known in the art for amplifying and/or filtering an analog signal. The processed data is provided to an analog to digital converter circuit where an analog to digital conversion is performed (block 455). Again, such an analog to digital conversion yields a series of digital samples corresponding to the input received from the analog front end processing. An equalization process is performed on the series of digital samples to yield an equalized data set (block 460).

The recently received data set is averaged with previously re-read data sets (block 465). In the case where the data set is the first re-read data set, the average is simply the currently received data set. The resulting averaged data set is stored to a buffer (block 470). Data processing is performed on the averaged output (block 475). Again, such data processing may be performed using any data processing approaches and/or circuitry known in the art. Where the data processing converges (block 480), the output resulting from the data processing is provided (block 485).

Otherwise, where the data processing failed to converge (block 480) it is determined whether the track offset has been decremented to the maximum negative offset (block 490). Where the track offset has not been decremented to the maximum negative offset (block 490), the track offset is decremented by a step value, and the head is re-positioned over the track in accordance with the new track offset (block 496). In some embodiments of the present invention, the step value and the maximum track offset value are programmable. With the head in this orientation, the processes of blocks 445, 450, 455, 460, 465, 470, 475, 480, 485, 490, 495, 496 are repeated. Alternatively, where the track offset has been decremented to the maximum negative offset (block 490) a failure to recover indication is provided (block 495).

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data recovery circuit, the circuit comprising:
   a controller circuit operable to position a sensor over a track of the storage medium at a first distance from the center of the track to yield a first data set, and operable to position the sensor over the track of the storage medium at a second distance from the center of the track to yield a second data set;

a data processing circuit operable to process a processing data set;

a selector circuit operable to select between the first data set and a combined data set as the processing data set;

a combining circuit operable to combine the first data set with at least the second data set to yield the combined data set.

2. The data recovery circuit of claim 1, wherein the combining circuit is an averaging circuit operable to average the first data set with at least the second data set to yield the combined data set.

3. The data recovery circuit of claim 2, wherein the averaging circuit comprises:

a coefficient table operable to provide a first coefficient and a second coefficient each corresponding to a number of data sets included in the combined data set;

an accumulation memory operable to store the combined data set;

a first multiplier circuit operable to multiply the first data set by the first coefficient to yield a first weighted data set;

a second multiplier circuit operable to multiply a prior instance of the combined data set by the second coefficient to yield a second weighted data set; and a summation circuit operable to sum the first weighted data set with the second weighted data set to yield the combined data set.

4. The data recovery circuit of claim 3, wherein the first data set is an initial data set, and wherein the first coefficient is one and the second coefficient is zero.

5. The data recovery circuit of claim 3, wherein the first data set is greater than the seventh consecutive data set, and wherein the first coefficient and the second coefficient are the same as for a previously combined data set.

6. The data recovery circuit of claim 1, wherein the circuit is implemented as part of an integrated circuit.

7. The data recovery circuit of claim 1, wherein the circuit is implemented in a read channel of a hard disk drive.

8. The data recovery circuit of claim 1, wherein the data processing circuit comprises:

a data detection circuit.

9. The data recovery circuit of claim 8, wherein the data processing circuit further comprises:

a data decoding circuit.

10. The data recovery circuit of claim 1, wherein the circuit further comprises:

a head location controller circuit operable to position the sensor relative to the storage medium.

11. The data recovery circuit of claim 10, wherein the first distance from the center of the track is controlled by the head location controller based upon an input from the controller circuit, and wherein the first distance from the center of the track is between a maximum positive offset and a negative maximum offset.

12. The data recovery circuit of claim 11, wherein the input from the controller circuit is generated at least in part on a programmable offset value and a programmable step value.

13. The data recovery circuit of claim 1, wherein the circuit further comprises:

an analog to digital converter circuit operable to receive a signal derived from the head and to provide a corresponding series of digital samples; and an equalizer circuit operable to equalize the series of digital samples to yield the first data set and the second data set.

14. A method for data recovery, the method comprising:

providing a storage medium having data stored along a track;

receiving a first data set corresponding to information sensed from the track using a sensor disposed over the track at a first offset distance from the center of the track;

receiving a second data set corresponding to information sensed from the track using the sensor disposed over the track at a second offset distance from the center of the track;

calculating the second offset from the center of the track, and wherein calculating the second offset from the center of the track is done by adding a step value to a previous offset position to yield the second offset from the center of the track;

combining the first data set with at least the second data set to yield a combined data set; and processing the combined data set.

15. The method of claim 14, wherein processing the combined data set includes performing a data detection on the data set.

16. The method of claim 14, wherein processing the combined data set includes performing a data decoding on the data set.

17. The method of claim 14, wherein the method further comprises:

positioning the sensor over the track at the first offset distance from the center of the track; and positioning the sensor over the track at the second offset distance from the center of the track.

18. The method of claim 14, wherein the first offset distance from the center of the track is a maximum offset, and wherein the maximum offset is programmable.

19. The method of claim 14, wherein combining the first data set with at least the second data set to yield the combined data set comprises:

averaging the first data set with at least the second data set such that the combined data set is an average data set.

20. A data storage device, the storage device comprising:

a storage medium maintaining information along a track;

a sensor device disposed in relation to the storage medium;

a controller circuit operable to position the sensor device over the track at a first distance from the center of the track to yield a first data set, and operable to position the sensor device over the track of the storage medium at a second distance from the center of the track to yield a second data set;

a data processing circuit operable to process a processing data set;

a selector circuit operable to select between the first data set and a combined data set as the processing data set;

a combining circuit operable to combine the first data set with at least the second data set to yield the combined data set.

21. The data storage device of claim 20, wherein the combining circuit is an averaging circuit operable to average the first data set with at least the second data set to yield the combined data set.

* * * * *